United States Patent [19]

Marino

[11] Patent Number: 4,980,245
[45] Date of Patent: Dec. 25, 1990

[54] MULTI-ELEMENT METALLIC COMPOSITE ARTICLE

[75] Inventor: Vincent Marino, Shirley, N.Y.

[73] Assignee: Precision Concepts, Inc., Shirley, N.Y.

[21] Appl. No.: 404,671

[22] Filed: Sep. 8, 1989

[51] Int. Cl.⁵ .................... B32B 15/20; C22F 1/08
[52] U.S. Cl. ......................... 428/671; 428/929; 148/11.5 Q; 200/266; 439/887
[58] Field of Search ............ 428/671, 670, 929, 669; 420/473; 148/11.5 Q; 439/887; 200/265, 266, 267, 268; 29/874, 877, 879

[56] References Cited

U.S. PATENT DOCUMENTS

| | | | |
|---|---|---|---|
| Re. 31,180 | 3/1983 | Plewes | 420/423 |
| 1,535,542 | 4/1925 | Price | 420/473 |
| 2,226,944 | 12/1940 | Reeve | 228/103 |
| 2,501,164 | 3/1950 | Durst | 200/268 |
| 2,777,929 | 1/1957 | Brennan | 219/10.53 |
| 3,134,701 | 5/1964 | Evans et al. | 148/11.5 Q |
| 3,268,701 | 8/1966 | Plante et al. | 200/266 |
| 3,499,211 | 3/1970 | Dubuc | 29/480 |
| 3,600,794 | 8/1971 | Shibata et al. | 29/470.1 |
| 3,648,355 | 3/1972 | Shida et al. | 428/929 |
| 3,821,848 | 7/1974 | Backstrom | 228/243 |
| 3,837,818 | 9/1974 | Happ et al. | 428/671 |
| 4,069,370 | 1/1978 | Harmsen et al. | 428/671 |
| 4,144,433 | 3/1979 | Zelahy et al. | 219/10.53 |
| 4,252,263 | 2/1981 | Houston | 228/243 |
| 4,373,970 | 2/1983 | Scorey et al. | 148/11.5 C |
| 4,456,662 | 6/1984 | Malikowski et al. | 228/263.18 |
| 4,480,014 | 10/1984 | Milligan et al. | 428/929 |
| 4,523,711 | 6/1985 | Kondo et al. | 228/263.18 |
| 4,735,868 | 4/1988 | Robinson et al. | 428/675 |

FOREIGN PATENT DOCUMENTS

| | | | |
|---|---|---|---|
| 58578 | 8/1982 | European Pat. Off. | |
| 55-148740 | 11/1980 | Japan | 420/473 |
| 56-265 | 1/1981 | Japan | 420/473 |
| 56-5942 | 1/1981 | Japan | 420/473 |
| 60-127673 | 7/1985 | Japan | 428/680 |
| 60-238464 | 11/1985 | Japan | 428/671 |
| 61-143540 | 7/1986 | Japan | 420/473 |
| 934559 | 8/1963 | United Kingdom | |

OTHER PUBLICATIONS

Ametek Inc. Brochure Form 3M88F (1988).
J. M. Ney Company Brochure C-10B, Rev. B (Jan. 1986).
T. J. Louzon, Copper-Nickel-Tin Spinodal Alloys, Chemical Abstracts, vol. 100, 112676, 1983.
J. M. Ney Co., Bloomfield, Conn., Brochure on "Precious Metals, Electrical Contacts and Contact Components", 1973, Class 200/266.
R. J. Russell, "Properties of Inlay Clad Wrough Gold Alloys", Solid State Technology, Aug. 1976, pp. 39–48, Class 428/929.
CDA Alloy 725–Alloy Digest–Data on World Wide Metals and Alloys, Mar. 1971, 2 pages, Class 420/473.
Metals Handbook–9th Ed., vol. 2, p. 378.
Metals Handbook–9th Ed., vol. 6, p. 758.
N. Harmsen, IEEE Transactions on Components, Hybrids, and Manufacturing Technology, vol. CHMT-1, No. 1, Mar. 1978, pp. 79–83.

*Primary Examiner*—John J. Zimmerman
*Attorney, Agent, or Firm*—Brumbaugh, Graves, Donohue & Raymond

[57] ABSTRACT

A metallic composite alloy composition useful in electrical components comprises at least one base metal alloy constituent metallurgically bonded to at least one noble metal alloy constituent. A process for producing the metallic composite alloy comprises metallurgically bonding of the base metal alloy to the noble metal alloy. The metallic composite alloy is particularly useful in fabricating an electrical contact and spring member assembly in which the contact portion comprises at least one noble metal alloy and the spring member comprises at least one base metal alloy.

20 Claims, 1 Drawing Sheet

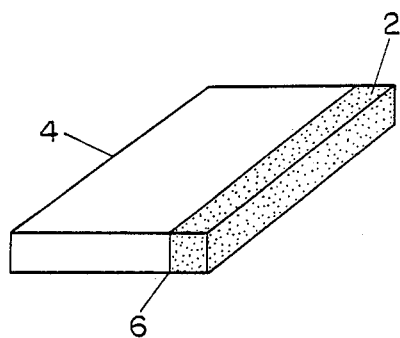
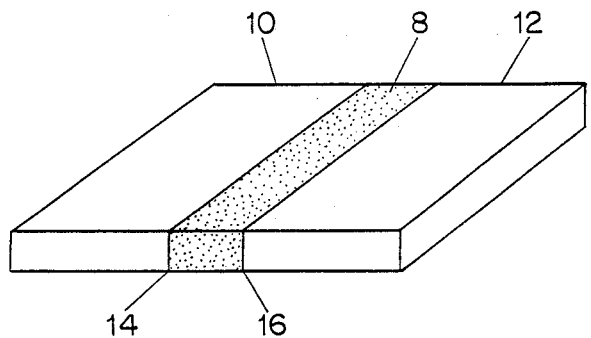
FIG. 1A          FIG. 1B
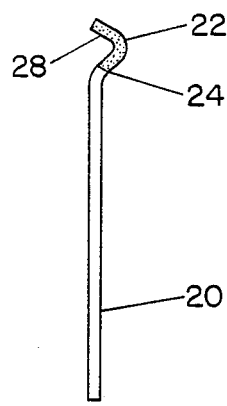
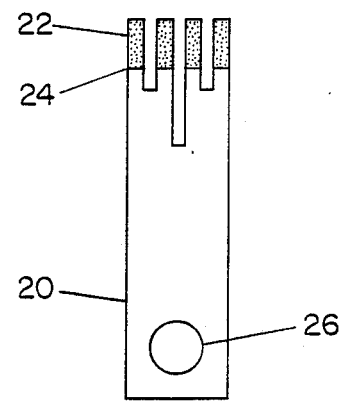
FIG. 2B          FIG. 2A

MULTI-ELEMENT METALLIC COMPOSITE ARTICLE

BACKGROUND OF THE INVENTION

This invention relates to a multi-element metallic composite alloy, a process for producing such a composite, an electrical contact and spring member assembly fabricated from such a composite, and a method for producing such an assembly. More particularly, this invention relates to a multi-element metallic composite alloy comprising at least one base metal alloy constituent which is metallurgically bonded to at least one noble metal alloy constituent, and to a process for producing such a multi-element metallic composite alloy. The composite and process of the instant invention are particularly useful in fabricating electrical contact materials which have enhanced electrical and mechanical properties. This invention also relates to an electrical contact and spring member assembly in which the contact portion, which comprises at least one noble metal alloy, is metallurgically bonded to the spring member portion, which comprises at least one base metal alloy, and to a method for producing such an assembly.

The use of base metal alloys as electrical connectors is well known to those skilled in the art due to their enhanced formability during processing, enhanced spring properties after aging, stability during age hardening, elevated temperature stability in service. It is also well known to those skilled in the art that noble metal alloy materials have excellent electrical conducting properties and are useful in a variety of electrical and electronic applications; for example, as a sliding contact in precision potentiometers, such as might be found in automobile engine control systems. However, the fabrication of electronic components from solid noble metal alloy materials is extremely expensive. In addition, such alloys tend to be brittle, lacking the spring properties and elevated temperature stability of base metal alloys. It would therefore be highly advantageous if the properties of noble metal and base metal alloys could be combined in a single composition from which electronic components and other materials requiring these properties could be fabricated.

It is one object of this invention to realize the potential of multi-element alloy composites by providing a process by which noble and base metal alloys may be metallurgically bonded together. It is one feature of this invention that the composite alloy combines the high spring properties of the base metal alloy with the superior electrical contact properties of the noble metal alloy.

The composite alloy of this invention is advantageous in that it has enhanced electrical and spring properties, greater stability at elevated operating temperatures, experiences minimal distortion while being age hardened, exhibits improved elevated temperature relaxation properties, and exhibits no formation of intermetallics and complex or undesirable alloys in the bond area between the dissimilar alloys, thereby enhancing its electrical and mechanical properties. The process of the instant invention is advantageous it that it produces a composite alloy composition having the above-described properties. The composite alloy and process of this invention may be used in any electrical contact application such as in potentiometers, switches, relays, contacts and the like. Such devices may be employed in a variety of commercial, industrial, and research settings in a variety of products.

Another advantage of the composite and process of this invention is that the age hardening characteristics of the noble and base metal alloy constituents are both enhanced and made compatible to one another as compared with each constituent's unbonded natural state. More particularly, the composite and process of this invention are advantageous in that the hardening characteristics of the composite are improved and equalized when compared to bimetallic alloy compositions comprising alloys of beryllium-copper and beryllium-nickel.

The electrical contact and spring member assembly of this invention is advantageous in that is combines the excellent electrical properties of the noble metal alloy and the excellent strength and stability properties of the base metal alloy. The assembly is also advantageous in terms of cost, as less of the more expensive noble metal alloy material is required since the spring member is fabricated from the base metal portion of the composite alloy. The method of this invention is advantageous in that it produces the assembly, which has many commercial uses.

This invention is also advantageous in that it specifically excludes the use of beryllium-copper alloys as the base metal constituent, thereby avoiding the extra processing and special handling ordinarily required for toxic beryllium-containing materials.

SUMMARY OF THE INVENTION

This invention is directed to a multi-element metallic composite alloy useful in electrical components which comprises at least one base metal alloy constituent metallurgically bonded to at least one noble metal alloy constituent, and to a process for producing such a composition by metallurgically bonding the adjoining faces of the base metal and noble metal alloys. This invention is also directed to an electrical contact and spring member assembly in which the contact portion, which comprises at least one noble metal alloy, is metallurgically bonded to the spring member, which comprises at least one base metal alloy, and to a method of producing such an assembly. Electrical contact and spring member assemblies of this invention are advantageous in that they combine the superior electrical contact properties of the noble metal alloy with the superior strength and temperature properties of the base metal alloy spring member.

BRIEF DESCRIPTION OF THE DRAWINGS

FIG. 1 depicts isometric views of two distinct embodiments of the composite alloy of this invention.

FIG. 2 depicts front and side views of one embodiment of the electrical contact and spring member assembly of this invention.

DESCRIPTION OF THE INVENTION

This invention will become apparent from the following detailed description.

As used in this description and in the appended claims, the term "base metal alloy" refers to a metal alloy comprising the elements copper, nickel and tin, except that beryllium-containing alloy compositions such as beryllium-copper alloy compositions are specifically excluded from the term "base metal alloy."

A typical base metal alloy which may be employed in the instant invention comprises a major amount of copper, about 10-20, preferably 14.5-15.5 weight percent nickel, about 3.5-11.5, preferably 7.5-8.5 weight percent tin, and less than about 1.0, preferably 0.1 weight percent of other elements. The invention expressly does not include the beryllium-copper alloys designated by Copper Development Association (CDA) as CDA 170, CDA 172, CDA 173, and CDA 175.

One example of such a base metal alloy suitable for use in this invention is sold by Ametek, Inc. under the trademark "PFINODAL" and is described in Ametek brochure Form 3M88F (1988). PFINODAL is a copper-nickel-tin spinodal alloy produced by a proprietary powder metallurgical process and described by the American Society for Testing Materials (ASTM) Standard B740 and CDA designation C72900. The typical chemical composition and physical properties of a PFINODAL-type metal alloy suitable for use in this invention are set forth in Table I below.

which are not readily oxidized such as gold, silver, mercury, platinum, zinc, palladium, iridium, rhodium, ruthenium and osmium.

A typical noble metal alloy which may be employed in the instant invention comprises about 0-46 weight percent palladium, about 3.0-40 weight percent silver, about 10-20 percent copper, about 0-15 weight percent platinum, about 0-3.0 weight percent nickel, about 0-75.0 weight percent gold, and about 0-3.0 weight percent zinc. Examples of noble metal alloys suitable for use in the instant invention include alloys commercially developed by the J.M. Ney Company and sold under the trademark names "PALINEY" and "NEYORO", such as PALINEY 6, PALINEY 7, PALINEY 9 and NEYORO G, with PALINEY 6 being particularly preferred. These materials are described in J.M. Ney brochure C-1801-10B rev. B (Jan. 1986). The chemical compositions and physical properties of these

TABLE I

| 1. CHEMICAL COMPOSITION (wt. %) | |
|---|---|
| NICKEL | 14.5-15.5% |
| TIN | 7.5-8.5% |
| COPPER | BALANCE |
| COPPER AND NAMED ELEMENTS | 99.9% |
| OTHER ELEMENTS | 0.1% MAXIMUM |
| 2. SELECTED PHYSICAL PROPERTIES | |
| Electrical Conductivity at 68° F. (20° C.) | 7.8 % IACS |
| Electrical Conductivity at 392° F. (200° C.) | 7.3 % IACS |
| Thermal Capacity (Specific Heat) | 0.09 Btu/lb.° at 68° |
| Thermal Conductivity | 17 Btu/Ft. Ht. °F. at 68° |
| Coefficient of Thermal Expansion | $9.1 \times 10^{-6}$ Per °F., 68° F.-572° F. |
| | $16.4 \times 10^{-6}$ Per °C., 20° C.-200° C. |
| Modulus of Elasticity (Tension) | $18.5 \times 10^6$ psi |
| Modulus of Rigidity | $7.5 \times 10^6$ psi |
| Density | 0.323 lb./in$^3$ |

As used in this description and in the appended claims, the term "noble metal alloy" refers to a metal alloy comprising one or more so called noble metals alloys, which are typical of those suitable for use as noble metal alloys in this invention, are as set forth in Table II below.

TABLE II

| | PALINEY 6[a] | PALINEY 7[b] | PALINEY 9 | NEYORO G |
|---|---|---|---|---|
| 1. Chemical Composition (wt %) | | | | |
| Palladium | 44 | 35 | 35 | 0 |
| Silver | 38 | 30 | 30 | 4.5 |
| Copper | 16 | 14 | 15 | 14.5 |
| Platinum | 1 | 10 | 10 | 8.5 |
| Nickel | 1 | 0 | 0 | 0 |
| Gold | 0 | 10 | 10 | 71.5 |
| Zinc | 0 | 1 | 0 | 1 |
| 2. Selected Physical Properties* | | | | |
| Resistivity, nominal | | | | |
| ohm cf | 180 | 200 | 240 | 125 |
| microhm cm | 29.9 | 33.2 | 39.9 | 20.8 |
| Density | | | | |
| g/cc, nominal | 10.8 | 11.8 | 11.9 | 15.9 |
| dint./cu. in., nominal | 114 | 124.5 | 125 | 167.5 |
| Solidus Temperature | | | | |
| °F., nominal | 1890 | 1860 | 1950 | 1700 |
| °C., nominal | 1032 | 1015 | 1065 | 925 |
| Mod. of Elas., psi, nominal | $16 \times 10^6$ | $17 \times 10^6$ | $17 \times 10^6$ | $16 \times 10^6$ |
| Prop. Limit, psi, nominal | 90,000 | 135,000 | 120,000 | 120,000 |
| Ult. Tensile Strength, psi | $1.35\text{-}1.65 \times 10^5$ | $1.4\text{-}1.7 \times 10^5$ | $1.4\text{-}1.6 \times 10^5$ | $1.3\text{-}1.7 \times 10^5$ |

TABLE II-continued

|  | PALINEY 6[a] | PALINEY 7[b] | PALINEY 9 | NEYORO G |
|---|---|---|---|---|
| Elongation, % in 2" min | 8 min. | 10-20 | 12 | 4-14 |
| Knoop Hardness, 100 g |  |  |  |  |
| load | 260-330 | 280-340 | 275-340 | 270-340 |

*At Stress Relieved Condition
[a] Described by ASTM Standard B563
[b] Described by ASTM Standard B540

Any conventional metallurgical bonding method typically known to those skilled in the art may be employed to bond the base and noble metal alloy constituents, with electron beam (EB) welding and radio frequency (RF) diffusion bonding being preferred, and RF diffusion bonding being particularly preferred.

In the past, the standard industry practice has been to use EB welding for joining dissimilar metals. For example, EB welding has been used commercially by the Leach & Garner Company to join beryllium-copper alloys with noble metals, although EB welding typically produces a large heat affected zone (HAZ) on each side of the welded junction, the HAZ having a width up to 0.030 inches. The large width of the HAZ, together with its relatively slow cooling rate, causes complex alloys known as intermetallics to be formed which both weaken the composite and increase the amount of noble metal alloy required in the final product, thereby increasing the cost.

Although EB welding may be employed, in a particularly preferred embodiment of this invention the base and noble metal alloy constituents of the composite alloy are metallurgically bonded by means of RF diffusion bonding, thereby avoiding the formation of intermetallics and complex or undesirable alloys in the bond area, and enhancing the electrical properties of the composite. It has been discovered that by employing RF diffusion bonding to join the constituent alloys, the HAZ created is stronger than that created by the EB welding technique. A crucial distinction between the two bonding methods is that the RF diffusion bonding technique joins the dissimilar alloys by metallurgical diffusion, not liquefaction and subsequent solidification as in EB welding. The result is that the composite exhibits no complex or undesirable alloys in the bond area, with resulting enhanced electrical properties.

The RF diffusion bonding technique employed in a particularly preferred embodiment of this invention typically causes overall metal temperature ranging from 1000° F. to the liquidus temperature of the alloy constituents, typically 1000-2500° F., to achieve the desired bonding results. The bond zone resulting in the composite alloy has a typical width ranging from 0.001-0.025, say 0.002 inches. The HAZ produced by RF diffusion bonding is stronger than a typical electron beam welded HAZ due to both the heating and cooling rates used to bond the dissimilar alloys and the size and shape of the bond produced by metallurgical diffusion instead of liquefaction and subsequent solidification of the alloys.

In practicing this invention, the noble metal alloy constituent is typically first work hardened and shaped to a rectangular cross-section prior to bonding. Such shaping may be accomplished, for example, by precision machining, by forming the noble metal through a square die, or by "turksheading", a process known to those skilled in the art which involves passing a round wire through very small rollers aligned in the desired geometry to shape round wire to a rectangular cross-section with the desired face length. After shaping, the noble metal is typically wound onto a spool in transverse fashion, and subsequently annealed in a manner known to those skilled in the art, such as in a continuous strand annealing furnace, at temperatures ranging from 1000-2000° F. and a line speed ranging from 1-10 feet per minute. After annealing, the noble metal is quenched, a metallurgical term having its usual meaning, to avoid precipitation, and subsequently allowed to slowly cool to temperatures below 500° F. After cooling, the squared and annealed noble metal constituent is typically wound onto a spool in a transverse fashion. Round PALINEY-type wires with tempers ranging from annealed to hard may be used in this invention, and tempering such that the squared wire ranges from annealed to extra hard will be successful in this invention.

The base metal alloy constituent is typically prepared for bonding by cutting and "rolling", a term known to those skilled in the art, to a square cross-sectional shape at the desired thickness. The edges may thereafter be made perfectly square by a process known to those skilled in the art as "edge skiving". The base metal is then typically annealed in a manner similar to that described above for the noble metal alloy constituent, and wound onto a spool.

The base and noble metal alloy constituents are thereafter metallurgically bonded. As previously discussed, RF diffusion bonding is particularly preferred. This is typically accomplished by feeding separate coils of each alloy into a RF bonding apparatus which contains tooling to facilitate the creation of an extremely localized zone of temperature and pressure sufficiently high to cause metallurgical diffusion bonding of the noble metal to the base metal. The bond formed is an even diffusion of the noble metal into one edge of the base metal, with no evidence of complex intermetallics, voids, pits or other inconsistencies. As a result of the bonding operation, the base metal grain structure resembles that of annealed material in an area extending from the bond up to about ⅛ inch from the bond. The bond zone typically has a width of about 0.001-0.025 inches. The noble metal or PALINEY constituent typically has a grain structure resembling that of an annealed material after the bonding has been accomplished.

Subsequent to bonding, the bonded composite is typically brushed to remove minute particulate matter which may have become attached to the surface of the material during bonding, and thereafter is stress relieved at temperatures typically in the range of 1200-2000° F., typically 1500-2000° F. Stress relieving may be accomplished in the previously described annealing furnace with a line speed ranging from 2.5-10 feet per minute; the composite is then quenched and allowed to gradually cool, as previously described.

After stress relieving, the composite is typically alternately reduced in thickness by rolling or cold working and annealed. The composite is then typically again stress relieved prior to final mechanical reduction to temper and size. The composite may then be edge skived to give the composite a radius on its noble metal portion. The radius is typically in the range of 0.0015–0.010 inches. This curved edge will typically become the electrical contact point for the components made from the composite. By edge-skiving the composite material, the need to tumble the finished parts is eliminated. "Tumbling" is a metal working term known to those skilled in the art, and is ordinarily standard industry practice. However, because it causes distortion of parts and premature wear of the contact points, it is highly advantageous if it can be eliminated.

After edge skiving, the composite may be stamped to form the desired shaped parts in any conventional stamping process known to those skilled in the art. Subsequent to stamping, the parts may be heat treated at temperatures in the range of 600–950° F., typically 700–950° F. for periods ranging from 10 minutes to 4 hours to achieve the desired final metallurgical and electrical properties.

In one preferred embodiment of the instant invention, a singular rectangular section of the noble metal alloy constituent is RF diffusion bonded to a singular rectangular section of the base metal alloy constituent to produce a composite of this invention. In this embodiment, as depicted in FIG. 1A, noble metal alloy constituent 2 has been bonded to base metal alloy constituent 4 by means of RF diffusion bonding, which produces bond zone 6. A composite such as depicted in FIG. 1A may be described as an "edge lay" composite in that noble metal alloy 2 has been RF diffusion bonded to one edge of base metal alloy 4. An example of the process of this invention as employed to produce such a composite is set forth in Example 1 below. All temperatures in Example 1 are oven temperatures unless otherwise stated.

EXAMPLE 1

A noble metal alloy material (PALINEY 6) having a composition of about 44 weight percent palladium, about 38 weight percent silver, about 16 weight percent copper, about 1.0 weight percent platinum, and about 1.0 percent nickel in the form of round-shaped cross-section wire having a diameter of 0.062 inches was work hardened to a three quarter to full-hardness temper and shaped to a square cross-section with a 0.028 inch face length by turksheading. After turksheading the wire to a 0.028 inch square cross-section, it was wound onto a spool in a transverse fashion for annealing.

The annealing operation was carried out in a continuous strand annealing furnace in a protective atmosphere of dissociated ammonia. The annealing operation altered the temper of the noble metal alloy material from full hard to annealed with corresponding changes in the physical properties and grain structure. Temperatures ranging from 1150–1600° F. in the continuous furnace were employed while the wire was fed into and moved through the furnace at speeds ranging from 1–10 feet per minute. As the wire exited the hot zone of the furnace, it was quenched in a water-cooled chill block. Thereafter, the wire entered a cooling chamber under protective atmosphere, where it was allowed to gradually cool to less than 500° F. At this point, the squared annealed wire was wound onto a spool in a transverse fashion.

The base metal alloy employed (PFINODAL C72900) was a copper alloy strip with a chemical composition of about 14.5–15.5 weight percent nickel, about 7.5–8.5 weight percent tin, and the balance being copper with about 0.1 weight percent or less comprising other elements. This alloy initially had a thickness of 0.062 inches, a width of 2.125 inches and was in a metallurgic condition known to those skilled in the art as TB00 (corresponding to an annealed temper). The material was first prepared by rolling to a square cross-sectional shape with a 0.028 inch thickness and slit to 0.61 inches in width. The rolling accomplished a tempering change in the alloy from TB00 (annealed) to TD04 (full hard) with a resulting change in its physical properties. The alloy was then edge skived to have perfectly square edges, and thereafter annealed and wound onto a spool.

The base metal and noble metal alloy constituents, as prepared above, were then bonded by means of RF diffusion bonding. This was accomplished by feeding separate coils of the individual alloy materials into a RF bonding apparatus and tooling setup to facilitate the creation of an extremely localized zone of temperature and pressure sufficiently high to cause metallurgical diffusion bonding of the noble metal to the base metal. The bond zone created had a width of about 0.002 inches. From this area onward, the grain structure gradually diminished in size to approximate that of the starting condition of the base material. The bonded composite material was then recoiled as one coil of bonded material.

Thereafter, the bonded composite was brushed and subsequently stress relieved at a temperature of 1590° F. and a line speed of three feet per minute. This was accomplished in a small continuous strand annealing furnace in a controlled atmosphere of dissociated ammonia. The bonded material experienced a one minute exposure at the above temperature. After exiting the furnace, the stress relieved composite was quenched in a water-cooled chill block immediately after the hot zone of the furnace, and the composite then entered a cooling chamber under protective atmosphere where it gradually cooled to less than 500° F.

After cooling, the composite material was rolled in several passes to reduce its thickness. In the first pass, the thickness was reduced to 0.0196 inches; in the second pass it was reduced to 0.0147 inches; in the third pass it was reduced to 0.0118 inches; and in the fourth pass it was reduced to about 0.0100 inches. This rolling schedule and amount of size reduction were employed to equalize the stresses which resulted from the RF diffusion bonding process and to sufficiently cold work the material for proper thermal processing. The base alloy portion of the composite underwent a change in temper from TB00–TD01 to TD03–TD04, with corresponding changes in its grain structure. The noble metal alloy portion of the composite underwent a change from an annealed state to a ¾-full hard state.

Subsequent to the above-described size reduction, the composite was annealed at 1700° F. and a line speed of 5.5 feet per minute in the above-described furnace, resulting in a full working anneal (i.e. all stresses from the rolling operation were removed and the composite had recrystallized and begun grain growth). Both alloy constituents of the composite were annealed, with corresponding physical properties and grain structures. The annealing also resulted in uniform grain structure in the base metal constituent portion of the composite from the bond zone to the opposite edge of the strip. After annealing, the composite was again rolled in several passes to further reduce its size and work-hardened to a full-hard state. On the first pass the composite was rolled to a thickness of 0.008 inches, on the second pass to a thickness of 0.007 inches, and on the third pass to a thickness of 0.0063 inches.

Subsequent to work-hardening, the composite was annealed at 1600° F. and a line speed of 5 feet per minute in the furnace to fully anneal the composite. Thereafter the composite was rolled in three passes as follows: in the first pass the composite was reduced in thickness to 0.0052 inches, in the second pass it was reduced to 0.0043 inches, and in the third pass it was reduced to 0.0038 inches. This reduction schedule prepared the composite for the final annealing and subsequent rolling to the temper required for stamping and final heat treatment.

The composite was thereafter stress-relieved at 1575° F. and a speed of 6 feet per minute in the furnace. Subsequent to stress relieving, the composite material had the physical properties of ¼ hard materials with a ductility comparable to that of the annealed state.

After stress relieving, the composite was reduced in thickness by rolling to a thickness of 0.003 plus or minus 0.0003 inches. This was the final thickness required prior to stamping, and in addition gave the composite a hardness in the TD01.5-TD02 range, with a grain structure corresponding to that of a stress-relieved material. The composite material was subsequently tension level rolled (a metal-working term familiar to those skilled in the art) by a combination of tension and deflection over small diameter rolls to assure that the composite material was flat and straight.

The composite was then edge skived to have a 0.0015 inch curved radius on the noble metal alloy portion of the composite. After edge skiving, the composite was inspected in coil form, and thereafter stamped to form the desired shaped parts in a conventional stamping process.

After stamping, the individual stamped parts were heat treated at 800° F. for 30 minutes to bring the parts to their final mechanical and electrical properties. The heating was carried out in a controlled atmosphere furnace with a microprocessor controlled heating, time-at-temperature, and cooling cycle. The parts were treated at temperatures of 750-850° F. for periods ranging from 10 minutes to 1.5 hours. The metallurgical result of the heat treatment was attainment of the spinodal decomposition in both the base metal and noble metal alloy portions of the composite, which strengthened the material. Although one skilled in the art would expect the results of this procedure to result in a set of physical properties for the composite typically corresponding to about TS02, the example of this invention unexpectedly resulted in improved metallurgical properties which corresponded to about TS04.5-TS05. Furthermore, the attained material compatibility in the composite simultaneously optimized the mechanical properties of both alloy constituents, thereby greatly enhancing the utility of the composite in its various intended applications.

In another preferred embodiment of this invention, a singular rectangular section of noble metal alloy constituent was RF diffusion bonded to two separate rectangular sections of base metal alloy to produce another embodiment of the composition of this invention. In this embodiment, as depicted in FIG. 1B, the noble metal alloy constituent 8 has been bonded to each of two separate sections 10 and 12 of base metal alloy constituent by means of RF diffusion bonding, which produces respective bond zones 14 and 16. A composite such as depicted in FIG. 1B may be described as a "thrulay" composite in that the noble metal alloy 8 is bonded on two parallel sides by the base metal alloy sections 10 and 12, and therefore in effect the noble metal alloy 8 has been laid through base metal alloy sections 10 and 12. An example of one embodiment of the process of this invention employed to produce such a composite is set forth in Example 2 below. All temperatures in Example 2 are oven temperatures unless otherwise stated.

EXAMPLE 2

A noble metal alloy material (PALINEY 6) having a composition as set forth in Example 1 in the form of round-shaped wire having a diameter of 0.062 inches was formed to a 0.038 inch by 0.070 inch rectangular cross-sectional wire using the same technique described in Example 1. A base metal alloy material (PFINODAL C72900, having the same composition previously described in Example 1) and an initial thickness of 0.038 inches and an initial width of 1.02 inches in the TB00 (annealed) condition was prepared by slitting to 1.000+/−.001 inches in width and machined to have perfectly square edges by edge skiving. This same procedure was repeated so that two pieces of 0.038 inch by 1.000+/−.001 inch TB00 base metal material were available.

The noble metal alloy piece was placed between the two base metal pieces, and the parallel faces of the noble metal alloy were RF diffusion bonded to the adjoining faces of each of the respective base metal alloy pieces. This was accomplished with the same RF bonding apparatus and tooling described in Example 1, although slightly different fixturing was required to hold the three individual pieces in close contact and to concentrate heat at each bond line.

Thereafter, the bonded composite was subsequently annealed at 1800° F. with a line speed of 3 feet per minute. The annealing operation was carried out in the furnace described in Example 1. The composite was then wet brushed to remove minute particulate matter which may have become attached to the surface of the material during bonding.

After cooling, the composite material was rolled in several passes to reduce its thickness. In the first pass, the thickness was reduced to 0.030 inches; in the second pass it was reduced to 0.025 inches; in the third pass it was reduced to 0.022 inches; and in the fourth pass it was reduced to about 0.020 inches in thickness.

The composite was then annealed at 1800° F. with a line speed of 3 feet per minute, the annealing procedure as previously described. After cooling, the composite material was again rolled in two passes to further reduce its thickness. In the first pass, the thickness was reduced to 0.013 inches; in the second pass it was reduced to 0.0095 inches.

Thereafter, the composite was once again annealed, this time at a temperature of 1800° F. and line speed of 5 feet per minute. After annealing, the composite was reduced in thickness by rolling to a thickness in the first pass of 0.0066 inches, and in the second pass to 0.0051+/−0.0002 inches. The composite was then stress relieved at 1550° F. with a line speed of 6 feet per minute in the above-described furnace. The composite was then rolled to reduce it to its final thickness of 0.0040+/−.0003 inches, with no wedge in the material. Slitting of the composite to a width of 0.707+/−0.002 inches was done at this point along a line at the midpoint of the noble metal portion to produce two "edge lay" composites as previously described.

The composite material was subsequently tension level rolled to insure that it was flat and straight. The noble metal alloy portion of the composite material was then edge skived to a 0.0015 inch radius on the noble metal alloy portion. As in Example 1, this dual bonded composite may be used in the fabrication of electrical components; for example by stamping to form the desired shape parts in any conventional stamping process which is well known to those skilled in the art.

Finally, as in Example 1, after stamping the individual stamped parts may be heat treated at 800° F. for 30 minutes to bring the parts to their final mechanical and electrical properties. The heat treating may be accomplished in the controlled atmosphere furnace described in Example 1.

In another specific embodiment, the composite material produced via the process described in Example 1 is used as a base material for fabricating electrical components. More specifically, it is used to fabricate an electrical contact and spring member assembly where the electrical contact portion of the assembly comprises the noble metal alloy portion of the composite, and the spring member portion of the assembly comprises the base metal portion of the composite. The assembly may, for example, be stamped from the composite of Example 1 and formed into its final shape by conventional means well known to those skilled in the art. The assembly is cost effective in that is requires the more expensive noble metal alloy only for the contact portion of the assembly. In addition, the assembly is advantageous in that the spring member has the superior properties of the base metal, the assembly as a whole has greater stability at elevated temperatures, as well as minimal distortion during age hardening. The assembly also has optimum bi-metal compatibility in that it exhibits excellent corrosion resistance, has well matched thermal expansion properties between the various alloys, and is strengthened by the spinodal decomposition which takes place during treatment of the composite as described in Example 1.

FIG. 2 depicts one embodiment of the electrical contact and spring member assembly of this invention, in which a sliding contact (known to those skilled in the art as a "wiper arm") often used in precision potentiometers is stamped and formed from the composite of this invention. FIG. 2A is a full view of the wiper arm in which the spring member portion 20 is composed of base metal alloy and contact portion 22 is composed of noble metal alloy, the alloys having been RF diffusion bond zone at 24 prior to stamping and forming of the wiper arm. Spring member portion 20 of the wiper arm has a circular hole 26 for connecting purposes made during stamping of the wiper arm. As shown in FIG. 2B, which is a side view of the wiper arm, the contact portion 22 has a curved surface 28 which was formed by edge skiving the noble metal portion of the composite, thereby enhancing the electrical contact point and avoiding the tumbling procedure, as previously discussed.

Although this invention has been illustrated by reference to specific embodiments, it will be apparent to those skilled in the art that various changes and modifications may be made which clearly fall within the scope of this invention.

I claim:

1. A metallic composite article comprising at least one base metal alloy constituent metallurgically bonded to at least one noble metal alloy constituent by means of diffusion bonding of the adjoining faces of the base metal and noble metal alloys, wherein the base metal alloy comprises a major amount of copper, about 10.0–20.0 weight percent nickel, about 3.5–11.5 weight percent tin, and less than about 1.0 weight percent of other metals, and the noble metal alloy comprises about 0–46 weight percent palladium, about 3.0–40 weight percent silver, about 10–20 weight percent copper, about 1–15.0 weight percent platinum, about 0–3.0 weight percent nickel, about 0–75.0 weight percent gold, and about 0–3.0 weight percent zinc.

2. A metallic composite article according to claim 1, in which the base metal alloy comprises a major amount of copper, about 14.5–15.5 weight percent nickel, about 7.5–8.5 weight percent tin, and less than about 0.1 weight percent of other metals, and the noble metal alloy comprises about 44 weight percent palladium, about 38 weight percent silver, about 16 weight percent copper, about 1.0 weight percent platinum, and about 1.0 weight percent nickel.

3. A metallic composite article according to claim 1, in which the base metal and noble metal alloys are reduced in thickness, formed into a rectangular shape with squared edges and annealed prior to bonding.

4. A metallic composite article according to claim 1, in which bonding of the base and noble metal alloys is accomplished by means of radio frequency diffusion bonding at an overall metal temperature of 1,000–2500° F., causing the formation of a bond zone having a width of 0.001–0.025 inches at the interface of the bonded edges.

5. A metallic composite article according to claim 1, in which the metallic composite is stress relieved at a temperature in the range of 1200–2000° F. subsequent to bonding, and in the range alternately reduced in thickness and annealed subsequent to stress relieving.

6. A metallic composite article according to claim 5, in which the metallic composite is, subsequent to annealing, further shaped to be square-edged with the noble metal alloy portion curved at a radius of 0.0015–0.010 inches along its exposed edge.

7. A metallic composite article according to claim 1, in which the composite is stamped to form electronic parts, the parts being heat treated at temperatures ranging from 600–950° F. subsequent to stamping.

8. A process for producing a metallic composite article of at least one base metal alloy constituent and at least one noble metal alloy constituent, the process comprising induction bonding of the adjoining faces of the base metal and noble metal alloys so as to yield a diffusion bond, wherein the base metal alloy comprises a major amount of copper, about 10.0–20.0 weight percent nickel, about 3.5–1.5 weight percent tin, and less than about 1.0 weight percent of other metals, and the noble metal alloy comprises about 0–46 weight percent palladium, about 3.0–40 weight percent silver, about 10–20 weight percent copper, about 0–15.0 weight percent platinum, about 0–3.0 weight percent nickel, about 0–75.0 weight percent gold, and about 0–3.0 weight percent zinc.

9. A process according to claim 8, in which the base metal alloy comprises a major amount of copper, about 14.5–15.5 weight percent nickel, and about 7.5–8.5 weight percent tin, and less than about 0.1 weight percent of other metals, and the noble metal alloy comprises about 44 weight percent palladium, about 38 weight percent silver, about 16 weight percent copper, about 1.0 weight percent platinum, and about 1.0 weight percent nickel.

10. A process according to claim 8, in which the base metal and noble metal alloys are reduced in thickness, formed into a rectangular shape with squared edges and annealed prior to bonding.

11. A process according to claim 8, in which bonding of the base and noble metal alloys is accomplished by means of radio frequency diffusion bonding at an overall metal temperature of 1,000-2500° F., causing the formation of a bond zone having a width of 0.001-0.025 inches at the interface of the bonded edges.

12. A process according to claim 8, in which the metallic composite is stress relieved at a temperature in the range of 1200-2000° F. subsequent to bonding, and alternately reduced in thickness and annealed subsequent to stress relieving.

13. A process according to claim 12, in which the metallic composite is, subsequent to annealing, further shaped to be square-edged with the noble metal alloy portion curved at a radius of 0.0015-0.010 inches along its exposed edge.

14. A process according to claim 8, in which the composite is stamped to form electronic parts, the parts being heat treated at temperatures ranging from 600-950° F. subsequent to stamping.

15. A process according to claim 8, comprising:
 (a) preparing the base metal and noble metal alloys for bonding by tempering, reducing thickness, machining the edges to square in shape, and annealing;
 (b) metallurgically bonding the adjoining faces of the base and noble metal alloys;
 (c) stress relieving the bonded composite;
 (d) alternately reducing the thickness and annealing the bonded composite;
 (e) stress relieving the bonded composite; and
 (f) shaping and machining the composite to square-edged with the noble metal alloy portion of the composite having a curved exposed edge.

16. A process according to claim 15, in which the base and noble metal alloys are bonded by means of radio frequency diffusion bonding.

17. A method of producing an electrical contact and spring member assembly which is a composite of a noble metal alloy contact and a base metal alloy spring member wherein the base metal alloy comprises a major amount of copper, about 10.0-20.0 weight percent nickel, about 3.5-11.5 weight percent tin, and less than about 1.0 weight percent of other metals, and the noble metal alloy comprises about 0-46 weight percent palladium, about 3.0-40 weight percent silver, about 10-20 weight percent copper, about 0-15.0 weight percent platinum, about 0-3.0 weight percent nickel, about 0-75.0 weight percent gold, and about 0-3.0 weight percent zinc, comprising:
 (a) preparing the base and noble metal alloys for bonding by tempering, reducing thickness, machining edges to square in shape, and annealing;
 (b) induction bonding the adjoining faces of the base and noble metal alloys so as to yield a diffusion bond;
 (c) stress relieving the bonded composite;
 (d) alternately reducing the thickness and annealing the bonded composite;
 (e) stress relieving the bonded composite;
 (f) flattening and straightening the composite;
 (g) shaping and machining the composite to square-edged with the noble metal portion of the composite having a curved exposed edge;
 (h) stamping and forming the electrical contact and spring member assembly from the composite by conventional means; and
 (i) heat treating the stamped and formed assembly.

18. A method according to claim 7, in which the base and noble metal alloys are bonded by means of radio frequency diffusion bonding.

19. An electrical contact and spring member assembly which is a composite of a noble metal alloy contact and a base metal alloy spring member wherein the base metal alloy comprises a major amount of copper, about 10.0-20.0 weight percent nickel, about 3.5-11.5 weight percent tin, and less than about 1.0 weight percent of other metals, and the noble metal alloy comprises about 0-46 weight percent palladium, about 3.0-40 weight percent silver, about 10-20 weight percent copper, about 0-15.0 weight percent platinum, about 0-3.0 weight percent nickel, about 0-75.0 weight percent gold, and about 0-3.0 weight percent zinc, the assembly produced by a method comprising:
 (a) preparing the base and noble metal alloys for bonding by tempering, reducing thickness, machining edges to square in shape, and annealing;
 (b) induction bonding the adjoining faces of the base and noble metal alloys so as to yield a diffusion bond;
 (c) stress relieving the bonded composite;
 (d) alternately reducing the thickness and annealing the bonded composite:
 (e) stress relieving the bonded composite;
 (f) flattening and straightening the composite;
 (g) shaping and machining the composite to square-edged with the noble metal portion of the composite having a curved exposed edge;
 (h) stamping and forming the electrical contact and spring member assembly from the composite by conventional means; and
 (i) heat treating the stamped and formed assembly.

20. An assembly according to claim 19, in which the base and noble metal alloys are bonded by means of radio frequency diffusion bonding.

* * * * *